(12) United States Patent
Laird

(10) Patent No.: US 8,545,985 B2
(45) Date of Patent: *Oct. 1, 2013

(54) COATED ARTICLE WITH ABSORBING LAYER

(75) Inventors: Ronald E. Laird, Dexter, MI (US); Carole Laird, legal representative, Dexter, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/332,401

(22) Filed: Dec. 21, 2011

(65) Prior Publication Data

US 2012/0094111 A1  Apr. 19, 2012

Related U.S. Application Data

(63) Continuation of application No. 11/898,557, filed on Sep. 13, 2007, now Pat. No. 8,101,278, which is a continuation of application No. 10/793,432, filed on Mar. 5, 2004, now Pat. No. 7,294,402.

(51) Int. Cl.
*B32B 17/06* (2006.01)

(52) U.S. Cl.
USPC ........... 428/428; 428/432; 428/697; 428/696; 428/699; 428/701; 428/702; 428/704

(58) Field of Classification Search
USPC ............ 428/432, 701, 702, 697, 698, 699, 428/704
See application file for complete search history.

(56) References Cited

U.S. PATENT DOCUMENTS

| 5,377,045 | A | | 12/1994 | Wolfe et al. | |
|---|---|---|---|---|---|
| 5,514,476 | A | | 5/1996 | Hartig et al. | |
| 5,552,180 | A | | 9/1996 | Finley et al. | |
| 5,557,462 | A | | 9/1996 | Hartig et al. | |
| 5,688,585 | A | * | 11/1997 | Lingle et al. | 428/216 |
| 5,800,933 | A | | 9/1998 | Hartig et al. | |
| 5,837,108 | A | * | 11/1998 | Lingle et al. | 204/192.15 |
| 5,948,538 | A | * | 9/1999 | Brochot et al. | 428/432 |
| 6,045,896 | A | * | 4/2000 | Boire et al. | 428/216 |
| 6,060,178 | A | * | 5/2000 | Krisko | 428/627 |
| 6,078,425 | A | * | 6/2000 | Wolfe et al. | 359/584 |

(Continued)

FOREIGN PATENT DOCUMENTS

| EP | 1 424 315 | 6/2004 |
|---|---|---|
| FR | 2 669 325 | 5/1992 |

(Continued)

OTHER PUBLICATIONS

U.S. Appl. No. 11/898,557, filed Sep. 13, 2007; Laird.

(Continued)

*Primary Examiner* — David Sample
*Assistant Examiner* — Lauren Colgan
(74) *Attorney, Agent, or Firm* — Nixon & Vanderhye P.C.

(57) ABSTRACT

A coated article is provided with an absorbing layer(s). The coating is, in certain example embodiments, designed so that significant changes in visible transmission can be made by adjusting thickness of the absorbing layer without significantly affecting certain other characteristics such as certain color values. Such coated articles may be used monolithically or in the context of insulating glass (IG) units in different embodiments of this invention, and may or may not be heat treated.

5 Claims, 3 Drawing Sheets

(56) References Cited

U.S. PATENT DOCUMENTS

| | | |
|---|---|---|
| 6,322,881 B1 | 11/2001 | Boire et al. |
| 6,445,503 B1 | 9/2002 | Lingle |
| 6,461,731 B1 | 10/2002 | Veerasamy et al. |
| 6,524,688 B1 | 2/2003 | Eby et al. |
| 6,524,714 B1 * | 2/2003 | Neuman et al. ............... 428/428 |
| 6,576,349 B2 | 6/2003 | Lingle et al. |
| 6,589,658 B1 | 7/2003 | Stachowiak |
| 6,602,608 B2 | 8/2003 | Stachowiak |
| 6,623,846 B2 | 9/2003 | Laird |
| 6,625,875 B2 | 9/2003 | Sol |
| 6,632,491 B1 | 10/2003 | Thomsen et al. |
| 6,673,427 B2 | 1/2004 | Guiselin et al. |
| 6,686,050 B2 * | 2/2004 | Lingle et al. ............... 428/428 |
| 6,692,831 B2 | 2/2004 | Stachowiak |
| 6,716,532 B2 * | 4/2004 | Neuman et al. ............... 428/428 |
| 6,942,923 B2 * | 9/2005 | Stachowiak ............... 428/428 |
| 7,090,921 B2 | 8/2006 | Stachowiak |
| 7,147,924 B2 | 12/2006 | Stachowiak |
| 7,150,916 B2 | 12/2006 | Lemmer et al. |
| 7,166,360 B2 * | 1/2007 | Coustet et al. ............... 428/432 |
| 7,294,402 B2 * | 11/2007 | Laird et al. ............... 428/428 |
| 7,597,965 B2 * | 10/2009 | Blacker et al. ............... 428/432 |
| 8,017,243 B2 * | 9/2011 | Blacker et al. ............... 428/428 |
| 8,101,278 B2 * | 1/2012 | Laird et al. ............... 428/428 |
| 2002/0031674 A1 | 3/2002 | Laird |
| 2002/0045037 A1 * | 4/2002 | Boire et al. ............... 428/216 |
| 2002/0064662 A1 * | 5/2002 | Lingle et al. ............... 428/432 |
| 2003/0031879 A1 * | 2/2003 | Neuman et al. ............... 428/428 |
| 2003/0049464 A1 * | 3/2003 | Glenn et al. ............... 428/432 |
| 2003/0108779 A1 * | 6/2003 | Neuman et al. ............... 428/698 |
| 2003/0170466 A1 * | 9/2003 | Stachowiak ............... 428/432 |
| 2003/0175529 A1 * | 9/2003 | Stachowiak ............... 428/432 |
| 2004/0005467 A1 * | 1/2004 | Neuman et al. ............... 428/432 |
| 2004/0028955 A1 | 2/2004 | Hoffman |
| 2004/0086723 A1 * | 5/2004 | Thomsen et al. ............... 428/426 |
| 2004/0101694 A1 * | 5/2004 | Lingle et al. ............... 428/426 |
| 2005/0123772 A1 * | 6/2005 | Coustet et al. ............... 428/432 |
| 2005/0196622 A1 * | 9/2005 | Laird et al. ............... 428/432 |

FOREIGN PATENT DOCUMENTS

| | | |
|---|---|---|
| WO | WO 02/48065 | 6/2002 |
| WO | WO-0248065 * | 6/2002 |
| WO | WO 03/093187 | 11/2003 |

OTHER PUBLICATIONS

Supplementary European Search Report dated Jun. 30, 2010.

"Coated Glass Applications and Markets" Hill et al., pp. 70-86.

* cited by examiner

COATED ARTICLE WITH ABSORBING LAYER

This application is a continuation of application Ser. No. 11/898,557, filed Sep. 13, 2007 (now U.S. Pat. No. 8,101,278), which is a continuation of Ser. No. 10/793,432, filed Mar. 5, 2004 (now U.S. Pat. 7,294,402), the entire disclosures of which are all hereby incorporated herein by reference in this application.

This invention relates to a coated article having an absorbing layer. In certain example embodiments, the absorbing layer may be adjusted in order to selectively alter transmission of the coated article. In certain examples, the thickness of the absorbing layer (i.e., absorption layer) can be adjusted to significantly adjust the transmission of the coated article without adversely affecting coloration thereof.

BACKGROUND OF THE INVENTION

Windows including glass substrates with solar control coatings provided thereon are known in the art. Such windows may be used in the context of architectural windows, automotive windows, and/or the like.

Consider the conventional coated article discussed below, which includes the below-listed layers on a glass substrate proceeding from the glass substrate outwardly:

| Layer | Thickness |
| --- | --- |
| Glass Substrate | |
| $TiO_2$ | 180 Å |
| $ZnO_x$ | 100 Å |
| Ag | 105 Å |
| $NiCrO_x$ | 30 Å |
| $SnO_2$ | 595 Å |
| $ZnO_x$ | 120 Å |
| Ag | 130 Å |
| $NiCrO_x$ | 30 Å |
| $SnO_2$ | 100 Å |
| $Si_3N_4$ | 195 Å |

While the aforesaid conventional coated article has excellent sheet resistance properties, it has a visible transmission of over 70%. Unfortunately, such high visible transmissions are undesirable in certain instances. For example, it is sometimes desirable to have a window such as an IG window unit which has a much lower visible transmission.

However, trying to transform a double-silver type complicated coating such as that set forth above into a form where visible transmission is significantly changed typically results in many other characteristics (e.g., color, heat treatability, etc.) also being significantly altered. Because of such multi-faceted changes which tend to occur simultaneously when a change is made, the result is typically that an entirely new coating must be designed.

A coated article glass/$SnO_2$/Ag/$NiCrOx$/$SnO_2$/Ag/$NiCrOx$/$SnO_2$ is also known. However, this coating is not heat treatable and does not have a heat treatable mate that substantially matches the optical characteristics thereof.

In view of the above, it will be appreciated by those skilled in the art that there exists a need for a coated article including a coating which can easily and efficiently be adjusted to allow for different values of visible transmission, and which may be heat treated in certain example instances.

BRIEF SUMMARY OF EXAMPLE EMBODIMENTS OF INVENTION

In certain example embodiments of this invention, a coated article is provided so as to include a coating which can easily and efficiently be adjusted to allow for different values of visible transmission to be realized. Moreover, in certain example embodiments, the coating may be designed so that significant changes in visible transmission can be made without significantly affecting certain other characteristics such as certain color values.

In certain example embodiments of this invention, a coated article is provided which is both heat treatable (e.g., can be thermally tempered) and can realize desirable color.

An absorbing layer(s) can be provided in the coating. The thickness of the absorbing layer can be adjusted in order to significantly changes the visible transmission of the coated article in certain example embodiments of this invention. Moreover, in certain example embodiments, the coating can be designed in a manner so that the thickness of the absorbing layer can be changed in order to significantly change visible transmission without significantly changing certain color characteristics such as reflective color of the coated article. This allows, for example, the absorbing layer to be used in order to increase and/or reduce visible transmission of a coated article while substantially maintaining the reflected color of commercially acceptable products.

In certain example embodiments, by adjusting the thickness of the absorbing layer, the transmission can be tuned to the desired level without adjusting the thickness of any other layer in the coating. This may be advantageous in that coatings with different transmission values can be set up without significant layer changes. This may provide the opportunity to customize the transmission level of a coated article for a particular application without having to use much different coater configurations or set-up procedures. For example, the transmission can be tuned solely by adjusting the absorbing layer thickness until the desired visible transmission level is reached (e.g., from 15 to 65% in an IG unit).

In certain example embodiments of this invention, there is provided a coated article which includes at least one absorption layer for absorbing at least some amount of visible light. The coating may be designed so that by adjusting thickness of the absorption layer (or absorbing layer), the visible transmission of the coated article can be changed by at least 7% (more preferably at least 10%, and most preferably at least 15%) without causing one or more of: (a) glass side reflective a* coloration to change by more than 2.0 (more preferably not more than 1.5, and most preferably not more than 1.0); (b) glass side reflective b* coloration to change by more than 2.0 (more preferably not more than 1.5, and most preferably not more than 1.0); (c) film side reflective a* coloration to change by more than 3.0 (more preferably not more than 2.0); and/or (d) film side reflective b* coloration to change by more than 2.0 (more preferably not more than 1.5, and most preferably not more than 1.0).

In certain example embodiments, there is provided a coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; an absorption layer comprising NiCr located such that both of the first and second IR reflecting layers are located over the absorption layer, wherein the absorption layer comprising NiCr is sandwiched between and contacting first and second layers comprising silicon nitride.

In other example embodiments, there is provided a method of tuning a coating of a coated article to adjust visible transmission to a desired level without significantly affecting certain color values, the method comprising: providing a coated article comprising: first and second IR reflecting layers spaced apart from one another by at least one dielectric layer, the second IR reflecting layer being located over the first IR reflecting layer; at least one dielectric layer located over the second IR reflecting layer; and an absorption layer; and adjusting a thickness of the absorption layer, without adjusting the thickness of any other layer in the coating, sufficiently to change a visible transmission of the coated article by at least 10%, and wherein as a result of this thickness change of the absorption layer a glass side reflective a* value of the coated article does not change by more than 1.5.

DETAILED DESCRIPTION OF EXAMPLES OF THE INVENTION

Figure 1:
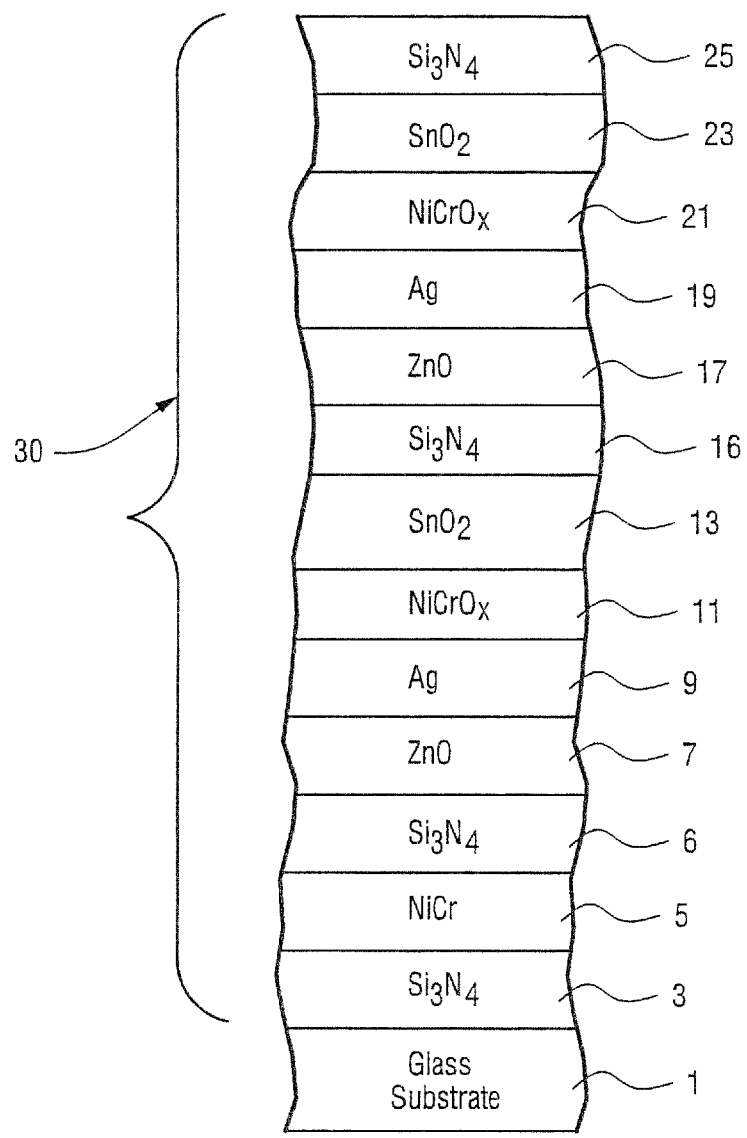
FIG. 1 is a cross sectional view of a coated article according to an example embodiment of this invention.

Referring now more particularly to the figures. like reference numerals herein indicate like parts or layers throughout the several views.

Certain embodiments of this invention provide a low-E coating or layer system that may be used in applications such as insulating glass (IG) window units, vehicle windows, skylights, glass doors, and the like.

Coated articles (e.g., monolithic or IG units) according to certain embodiments of this invention preferably have a visible transmission of from about 20-68% measured monolithically (more preferably from 20-65%, and most preferably from about 30-60%), and of from about 15-65% measured as an IG unit (more preferably from 15-60%, and most preferably from about 20-55%).

In certain example embodiments of this invention, a coated article is provided so as to include a coating which can easily and efficiently be adjusted to allow for different values of visible transmission to be realized. Moreover, in certain example embodiments, the coating may be designed so that significant changes in visible transmission can be made without significantly affecting certain other characteristics such as certain color values.

An absorbing layer(s) can be provided in the coating. The thickness of the absorbing layer can be adjusted in order to significantly changes the visible transmission of the coated article in certain example embodiments of this invention. Moreover, in certain example embodiments, the coating can be designed in a manner so that the thickness of the absorbing layer can be changed in order to significantly change visible transmission without significantly changing certain color characteristics such as reflective color of the coated article. This allows, for example, the absorbing layer to be used in order to increase and/or reduce visible transmission of a coated article while substantially maintaining the reflected color of commercially acceptable products.

In certain example embodiments, by adjusting the thickness of the absorbing layer, the transmission can be tuned to the desired level without adjusting the thickness of any other layer in the coating. This may be advantageous in that coatings with different transmission values can be set up without significant layer changes. This may provide the opportunity to customize the transmission level of a coated article for a particular application without having to use much different coater configurations or set-up procedures. For example, the transmission can be tuned solely by adjusting the absorbing layer thickness until the desired visible transmission level is reached (e.g., from 15 to 65% in an IG unit).

Surprisingly, it has been found that by locating the absorption layer in a certain position(s) in a coating (variants discussed herein) and via the use of certain materials, the overall coating can be designed so as to allow thickness adjustments to the absorbing layer to be made to adjust visible transmission of the coated article to a desired level without adversely affecting certain coloration characteristics of the coated article to any significant extent.

For example, the coating may be designed so that by adjusting thickness of the absorption layer (or absorbing layer), the visible transmission of the coated article can be changed by at least 7% (more preferably at least 10%, and most preferably at least 15%) without causing one or more of: (a) glass side reflective a* coloration to change by more than 2.0 (more preferably not more than 1.5, and most preferably not more than 1.0); (b) glass side reflective b* coloration to change by more than 2.0 (more preferably not more than 1.5, and most preferably not more than 1.0); (c) film side reflective a* coloration to change by more than 3.0 (more preferably not more than 2.0); and/or (d) film side reflective b* coloration to change by more than 2.0 (more preferably not more than 1.5, and most preferably not more than 1.0).

In the example context of IG units. this visible transmission can be coupled with at least one of: (a) a SHGC no greater than about 0.35, more preferably no greater than about 0.30, and most preferably no greater than about 0.28; and (b).fairly neutral reflective color from the exterior of the IG unit such that reflective a* is from −6.0 to 2.0 (more preferably from −5.0 to 0.5), and reflective b* is from −7.0 to 1.0 (more preferably from −5.0 to −1.0).

In certain example embodiments, measured monolithically, the coated article may have a glass side reflective a* value of from −8 to +2, more preferably from −6 to +1, and/or a glass side reflective b* value of from −15 to +5, more preferably from −6 to 0. In certain example embodiments, measured monolithically, the coated article may have a film side reflective a* value of from −6 to +2, more preferably from −5 to 0, and/or a film side reflective b* value of from −5 to +12, more preferably from 0 to +5.

In certain example embodiments of this invention, a coated article is provided which is both heat treatable (e.g., can be thermally tempered) and can realize desirable color. In other embodiments, heat treatment is not needed.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The coating (or layer system) 30 includes: silicon nitride layer 3 (e.g., a first dielectric layer), absorbing layer (or absorption layer) 5, silicon nitride layer 6 (e.g., second dielectric layer), first lower contact layer 7 (which contacts IR reflecting layer 9), first conductive and preferably metallic infrared (IR) reflecting layer 9, first upper contact layer 11 (which contacts layer 9), second dielectric layer 13 (which may be deposited in one or multiple steps in different embodiments of this invention), silicon nitride layer 16, second lower contact layer 17 (which contacts layer 19), second conductive and preferably metallic IR reflecting layer 19, second upper contact layer 21 (which contacts layer 19), dielectric layer 23, and finally protective overcoat dielectric layer 25. The "contact" layers 7, 11, 17 and 21 each contact at least one IR reflecting layer (e.g., Ag layer). The aforesaid layers 3-25 make up low-E (i.e., low emissivity) coating 30 which is provided on glass or plastic substrate 1.

In certain example embodiments of this invention, dielectric layers 3, 6 and/or 16 may be of or include silicon nitride. The silicon nitride in these layers may be of the stoichiometric type (i.e., $Si_3N_4$), or of a non-stoichiometric type. For example, in certain example instances silicon nitride layers 6 and/or 16 may be Si-rich in certain example embodiments of this invention. Example Si-rich silicon nitride layers are described in U.S. Pat. No. 6,686,050, the disclosure of which is hereby incorporated herein by reference. In certain example embodiments of this invention, silicon nitride in any silicon nitride layer discussed herein may be doped with Al (e.g., from 1-15% Al, more preferably from about 1-10% Al) or any other suitable conductive material.

Absorption layer 5 is, in certain example embodiments of this invention, located between and contacting dielectric layers 3 and 6. In certain example embodiments, each of layers 3 and 6 surrounding the absorption layer 5 is a nitride layer and is substantially or entirely non-oxidized. This is advantageous in that it helps prevent (or reduce the likelihood of) the absorption layer from being oxidized during heat treatment, thereby better allowing the absorption layer to perform its intended function of absorbing at least some amount (e.g., at least 5%, more preferably at least 10%) of visible light. It will be appreciated that if a layer becomes too oxidized, it no longer can function as an absorption layer.

In certain example embodiments of this invention, absorption layer 5 may be of or include NiCr (any suitable ratio or Ni:Cr). In certain example embodiments, it is desired that the absorption layer comprises from 0-10% oxygen, more preferably from 0-5% oxygen, and most preferably from 0-2% oxygen (atomic %). While NiCr is a preferred material for the absorption layer 5, it is possible that other materials may instead be used. For example, in certain other example embodiments of this invention, the absorption layer 5 may be of or include Ni, Cr, $NiCrN_x$, CrN, ZrN, or TiN. These materials may be desired for heat treatability purposes. In non-heat treatable embodiments, any of the aforesaid materials may be used for the absorption layer 5, as well as other materials such as Ti, Zr, $NiO_x$, or the like.

Infrared (IR) reflecting layers 9 and 19 are preferably metallic and/or conductive, and may be made of or include silver (Ag), gold. or any other suitable IR reflecting material. However. metallic Ag is the material of choice for the IR reflecting layers 9 and 19 in certain example non-limiting embodiments of this invention. These IR reflecting layers help allow coating 27 to have low-E and/or good solar control characteristics. The IR reflecting layer(s) may be slightly oxidized in certain embodiments of this invention.

The upper contact layers 11 and 21 (i.e., "upper" means the contact layers on top of the respective IR reflective layers 9, 19) are of or include nickel (Ni) oxide, chromium/chrome Cr) oxide, or a nickel alloy oxide such as nickel chrome oxide ($NiCrO_x$), in certain example embodiments of this invention. The use of, for example, $NiCrO_x$ for/in these layers enables durability to be improved, compared to the use of certain other materials (e.g., compared to zinc oxide). $NiCrO_x$ layers 11 and/or 21 may be fully oxidized in certain embodiments of this invention (i.e., fully stoichiometric), or may be at least about 50% oxidized in other embodiments of this invention. While $NiCrO_x$ is a preferred material for upper contact layers 11 and 21, those skilled in the art will recognize that other materials may instead be used (e.g., oxides of Ni, oxides of Ni alloys, oxides of Cr, oxides of Cr alloys, $NiCrO_xN_y$, zinc oxide, tin oxide, or other suitable material) for one or more of these layers in alternative embodiments of this invention. It is noted that upper contact layers 11 and/or 21 may or may not be continuous in different embodiments of this invention, depending upon their respective thickness(es). Upper contact layer(s) 11 and/or 21 (e.g., of or including $NiCrO_x$) may or may not be oxidation graded in different embodiments of this invention. Oxidation grading means that the degree of oxidation in the layer(s) changes throughout the thickness of the layer(s) so that for example a contact layer may be graded so as to be less oxidized at the contact interface with the immediately adjacent IR reflecting layer than at a portion of the contact layer(s) further or more/most distant from the immediately adjacent IR reflecting layer.

The lower contact layers 7 and 17 ("lower" means the contact layers on the underneath side of the IR reflecting layers 9, 19) are of or include zinc oxide (e.g., ZnO, where x if from 0.6 to 1.2 in different embodiments, more preferably x is from 0.7 to 1.0) in example embodiments of this invention. For example, lower contact layer(s) 7 and/or 17 may consist essentially of zinc oxide in certain embodiments of this invention, while in other embodiments of this invention lower contact layer(s) 7 and/or 17 may include or consist essentially of $ZnAlO_x$, where x is set to a value such that the % Al (by weight) in the layer is from about 0-15%, more preferably from about 0-6%, and most preferably from about 1-4%. The use of these materials (e.g., $ZnO_x$, $ZnAlO_x$, or the like) for lower contact layer(s) 7 and/or 17 allows visible transmission of the resulting coated article to be increased (compared to if $NiCrO_x$ was used for these layers), allows sheet resistance $R_s$ and/or emissivity to be reduced, and overall may allow solar performance to be improved. In $ZnO_x$ inclusive contact layer(s) 7 and/or 17, x may be set so that the layer is fully stoichiometric (e.g., ZnO), or alternatively may be set to a value from 0.4 to 0.99 so that the layer(s) is more conductive (e.g., this can be done by reducing the amount of oxygen gas and increasing the amount of Ar gas used during a sputter coating process). Additionally, in certain embodiments of this invention, layer(s) 7 and/or 17 have an index of refraction of from 1.8 to 2.2, more preferably from about 1.9 to 2.1.

It has been found that by using $ZnO_x$, $ZnAlO_x$, or the like for the lower contact layer(s) 7 and/or 17, while using $NiCrO_x$ for the upper contact layer(s) 11 and/or 21, the resulting coated article can achieve a combination of high visible transmission and reduced sheet resistance $R_s$, as well as acceptable durability (mechanical and/or chemical). The highly durable $NiCrO_x$ is used for the upper contact layers 11 and/or 21 for durability purposes, while the solar controlling $ZnO_x$, $ZnAlO_x$, or the like is used for the lower contact layer(s) 7 and/or 17 to improve visible transmission and/or other solar characteristics. In other words, the $NiCrO_x$ provides good durability, especially when on top of the Ag layers, and the zinc oxide inclusive contact layer(s) enable high visible transmission to be combined with low sheet resistance $R_s$ and/or good solar performance.

Dielectric layer 13 acts as a coupling layer between the two halves of the coating 30, and is of or includes tin oxide (e.g., $SnO_2$ or some non-stoichiometric form thereof) in certain embodiments of this invention. However, other dielectric materials may instead be used for layer 13, including but not limited to silicon nitride, titanium dioxide, niobium oxide, silicon oxynitride, zinc oxide, or the like.

Dielectric layers 23 and 25 allow the environmental resistance of the coating 30 to be improved, and are also provided for color purposes. In certain example embodiments, dielectric layer 23 may be of or include tin oxide (e.g., $SnO_2$), although other materials may instead be used. Dielectric overcoat layer 25 may be of or include silicon nitride (e.g., $Si_3N_4$) in certain embodiments of this invention, although other materials may instead be used such as titanium dioxide, silicon oxynitride, tin oxide, zinc oxide, niobium oxide, or the like. Layer 23 may be omitted in certain example embodiments of this invention.

Other layer(s) below or above the illustrated coating 30 may also be provided. Thus, while the layer system or coating 30 is "on" or "supported by" substrate 1 (directly or indirectly), other layer(s) may be provided therebetween. Thus, for example, coating 30 of FIG. 1 may be considered "on" and "supported by" the substrate 1 even if other layer(s) are provided between layer 3 and substrate 1. Moreover, certain layers of coating 30 may be removed in certain embodiments, while others may be added in other embodiments of this invention without departing from the overall spirit of certain embodiments of this invention.

Figure 2:
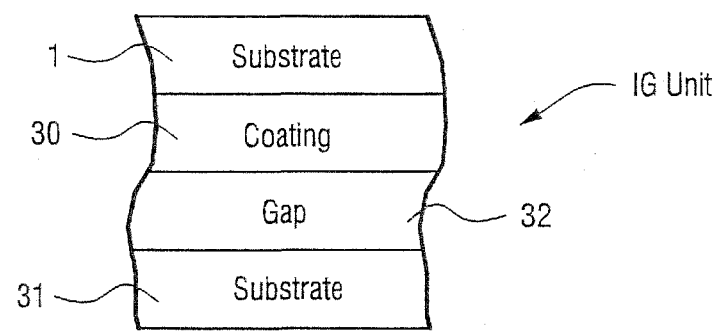
FIG. 2 is a cross sectional view of the coated article of FIG. 1 being used in an IG window unit according to an example embodiment of this invention.

FIG. 2 illustrates the coating or layer system 30 being utilized in an insulating glass (IG) window unit. Coatings 30 according to any embodiment herein may be used in IG units as shown in FIG. 2. The IG unit includes first and second glass sheets 1 and 31, with space or gap 32 therebetween. These two glass substrates 1, 31 (e.g. float glass 1-10 mm thick) are sealed at their peripheral edges by a conventional sealant and/or spacer (not shown) and may be provided with a conventional desiccant strip (not shown). The panes may then be retained in a conventional window or door retaining frame. By sealing the peripheral edges of the glass sheets and replacing the air in insulating space 32 with a gas such as argon, a typical, high insulating value IG unit may be formed. Optionally, insulating space 32 may be at a pressure less than atmospheric pressure in certain alternative embodiments (with or without a gas in space 32), although this of course is not necessary in all embodiments. The coating 30 may be on the inner surface of either substrate facing the gap 32.

Turning back to FIG. 1, while various materials and thicknesses may be used in different embodiments of this invention for layers in coating 30, example thicknesses and materials for the respective layers on the glass substrate 1 in the FIG. 1 embodiment are as follows (from the glass substrate outwardly):

Example Materials/Thicknesses; FIG. 1 Embodiment

| Layer | Preferred Range (Å) | More Preferred (Å) | Example (Å) |
|---|---|---|---|
| $Si_3N_4$ (layer 3) | 40-150 Å | 60-110 Å | 80 Å |
| NiCr (layer 5) | 10-200 Å | 15-100 Å | 33 or 63 Å |
| $Si_3N_4$ (layer 6) | 40-200 Å | 60-130 Å | 100 Å |
| $ZnO_x$ (layer 7) | 25-700 Å | 40-150 Å | 75 Å |
| Ag (layer 9) | 50-250 Å | 50-150 Å | 80 Å |
| $NiCrO_x$ (layer 11) | 5-100 Å | 15-60 Å | 30 Å |
| $SnO_2$ (layer 13) | 10-1,000 Å | 400-800 Å | 580 Å |
| $Si_3N_4$ (layer 16) | 40-200 Å | 60-130 Å | 100 Å |
| $ZnO_x$ (layer 17) | 25-200 Å | 40-150 Å | 75 Å |

-continued

| Layer | Preferred Range (Å) | More Preferred (Å) | Example (Å) |
|---|---|---|---|
| Ag (layer 19) | 50-250 Å | 80-220 Å | 174 Å |
| $NiCrO_x$ (layer 21) | 5-100 Å | 15-60 Å | 30 Å |
| $SnO_2$ (layer 23) | 0-500 Å | 70-200 Å | 100 Å |
| $Si_3N_4$ (layer 25) | 0-500 Å | 120-320 Å | 194 Å |

In certain exemplary embodiments of this invention, coating/layer systems 30 according to certain example embodiments have the following low-E (low emissivity) characteristics before and/or after heat treatment. It is noted that the term $E_n$ means normal emissivity/emittance and $R_s$ means sheet resistance.

Low-E Characteristics (No Heat Treatment)

| Characteristic | General | More Preferred | Most Preferred |
|---|---|---|---|
| $R_s$ (ohms/sq.): | <=5.0 | <=3.5 | <=2.8 |
| $E_n$: | <=0.07 | <=0.04 | <=0.03 |

EXAMPLES

The following examples are provided for purposes of example only, and are not intended to be limiting. Example processing techniques used for sputtering the Example coatings may be found in related U.S. Pat. No. 6,686,050, the disclosure of which is incorporated herein by reference.

Examples 1 and 2 are in accordance with the FIG. 1 embodiment, and have the layers shown in FIG. 1 with the below listed thicknesses (layers listed from the glass substrate outwardly).

Examples 1 and 2

Layer Stack

| Layer | Example 1 | Example 2 |
|---|---|---|
| Glass Substrate | | |
| $Si_3N_4$ (layer 3) | 80 Å | 80 Å |
| NiCr (layer 5) | 33 Å | 62.5 Å |
| $Si_3N_4$ (layer 6) | 100 Å | 100 Å |
| ZnO (layer 7) | 75 Å | 75 Å |
| Ag (layer 9) | 80 Å | 80 Å |
| $NiCrO_x$ (layer 11) | 30 Å | 30 Å |
| $SnO_2$ (layer 13) | 580 Å | 580 Å |
| $Si_3N_4$ (layer 16) | 100 Å | 100 Å |
| ZnO (layer 17) | 75 Å | 75 Å |
| Ag (layer 19) | 174 Å | 174 Å |
| $NiCrO_x$ (layer 21) | 30 Å | 30 Å |
| $SnO_2$ (layer 23) | 100 Å | 100 Å |
| $Si_3N_4$ (layer 25) | 194 Å | 194 Å |

It can be seen that the only difference between Examples 1 and 2 is the thickness of the absorption layer 5. In Example 1, the absorption layer 5 is 33 Å thick, whereas in Example 2 it is 62.5 Å thick. Examples 1 and 2 were characterized by the optical characteristics set forth below.

Optical Characteristics of Examples 1-2
(Monolithic)

|  | Example 1 | Example 2 |
|---|---|---|
| Visible Transmission (Y)(Ill. C. 2 deg.): | 60% | 46% |
| a* | −4.5 | −5.7 |
| b* | 4 | −1.8 |
| Glass Side Reflective (RY)(Ill C., 2 deg.): | 13.5% | 10.5% |
| a* | −6 | −5 |
| b* | −5 | −4.2 |
| Film Side Reflective (FY)(Ill. C., 2 deg.): | 7% | 7.5% |
| a* | −5 | −2.4 |
| b* | 2.5 | 3.3 |
| SHGC: | 0.29 | 0.22 |

It can be seen from the tables above that the increased thickness of the NiCr absorption layer 5 in Example 2 (compared to Example 1) resulted in a much lower visible transmission in Example 2 (compared to Example 1). In particular, Example 2 had a visible transmission of only 46.12% compared to 60% in Example 1. This is because the NiCr absorption layer 5 thickness was greater in Example 2; all other layers were unchanged.

Surprisingly, it has been found that by locating the absorption layer 5 in the location illustrated in FIG. 1 and Examples 1-2, the overall coating allows thickness adjustments to the absorbing layer 5 to be made to adjust visible transmission of the coated article to a desired level (e.g., without adjusting the thickness of any other layer in the coating) without adversely affecting coloration of the coated article to any significant extent. For example, it is surprising and unexpected that from Example 1 to Example 2, the increase in thickness of absorption layer 5 resulted in a large change in visible transmission of 13.88% (i.e., 60−46.12=13.88), but only a minor change of 1.0 in the glass side reflective a* value (i.e., the difference between −6 and −5). It is also surprising that from Example 1 to Example 2 the increase in thickness of absorption layer 5 resulted in a large change in visible transmission of 13.88%, but only a minor change of 0.8 in the glass side reflective b* value (i.e., the difference between −5 and −4.2). In a similar manner, it is surprising and unexpected that from Example 1 to Example 2, the increase in thickness of absorption layer 5 resulted in a large change in visible transmission of 13.88%, but only a minor change of 0.8 in the film side reflective b* value (i.e., the difference between 3.3 and 2.5).

When Examples 1 and 2 are used in IG window units, for example, the respective transmissions drop accordingly. For example, the visible transmission of Example 1 would drop to about 54% and the visible transmission of Example 2 would drop to about 40% in an IG unit.

Examples 3 and 4 are in accordance with another embodiment of this invention shown in FIG. 3, with the below listed thicknesses (layers listed from the glass substrate outwardly).

Examples 3 and 4

Layer Stack

| Layer | Example 3 | Example 4 |
|---|---|---|
| Glass Substrate |  |  |
| TiO$_2$ (layer 2) | 135 Å | 135 Å |
| Si$_3$N$_4$ (layer 6) | 100 Å | 100 Å |
| ZnO (layer 7) | 75 Å | 75 Å |
| Ag (layer 9) | 110 Å | 110 Å |
| NiCrO$_x$ (layer 11) | 20 Å | 20 Å |
| SnO$_2$ (layer 13) | 660 Å | 660 Å |
| Si$_3$N$_4$ (layer 16) | 100 Å | 100 Å |
| ZnO (layer 17) | 75 Å | 75 Å |
| Ag (layer 19) | 149 Å | 149 Å |
| NiCr (layer 5) | 25 Å | 72.5 Å |
| Si$_3$N$_4$ (layer 25) | 245 Å | 245 Å |

It can be seen that the only difference between Examples 3 and 4 is the thickness of the NiCr absorption layer 5 which is located over the top Ag layer in the double-silver stack. In Example 3, the absorption layer 5 is 25 Å thick, whereas in Example 4 it is 72.5 Å thick. Examples 3 and 4 were characterized by the optical characteristics set forth below.

Optical Characteristics of Examples 3-4
(Monolithic)

|  | Example 3 | Example 4 |
|---|---|---|
| Visible Transmission (Y)(Ill. C. 2 deg.): | 60.4% | 46.2% |
| a* | −3 | −4 |
| b* | −0.2 | −2 |
| Glass Side Reflective (RY)(Ill C., 2 deg.): | 10.5% | 12.5% |
| a* | −3.1 | 0.8 |
| b* | −6.5 | −12 |
| Film Side Reflective (FY)(Ill. C., 2 deg.): | 17% | 20.1% |
| a* | −3.9 | −3.5 |
| b* | 5.2 | 10.4 |
| SHGC: | 0.32 | 0.25 |

It can be seen from the tables above that the increased thickness of the NiCr absorption layer 5 in Example 4 (compared to Example 3) resulted in a much lower visible transmission in Example 4 (compared to Example 3). In particular, Example 4 had a visible transmission of only 46.2% compared to 60.4% in Example 3. This is because the NiCr absorption layer 5 thickness was greater in Example 4; all other layers were unchanged.

Figure 3:
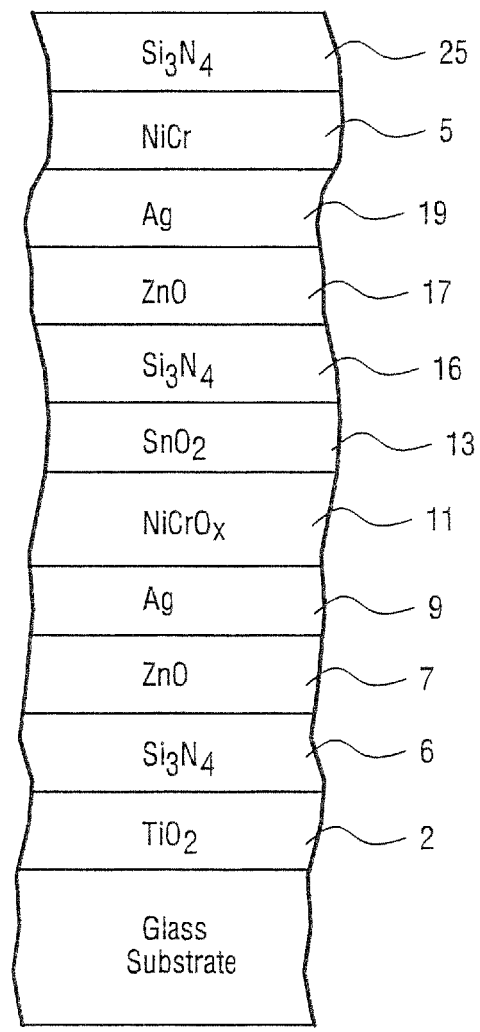
FIG. 3 is a cross sectional view of a coated article according to another example embodiment of this invention.

Surprisingly, it has been found that by locating the absorption layer 5 in the location illustrated in FIG. 3 and Examples 3-4, the overall coating allows thickness adjustments to the absorbing layer 5 to be made to adjust visible transmission of the coated article to a desired level (e.g., without adjusting the thickness of any other layer in the coating) without adversely affecting coloration of the coated article to any significant extent. For example, it is surprising and unexpected that from Example 3 to Example 4, the increase in thickness of absorption layer 5 resulted in a large change in visible transmission of 14.2% (i.e., 60.4−46.2=14.2), but only a minor change of 0.4 in the film side reflective a* value (i.e., the difference between −3.9 and −3.5). It is also surprising that from Example 3 to Example 4 the increase in thickness of absorption layer 5 resulted in a large change in visible transmission of 14.2%, but only a minor change of 1.0 in the transmissive a* color value.

When Examples 3 and 4 are used in IG window units, for example; the respective transmissions drop accordingly. For example, the visible transmission of Example 3 would drop to about 54% and the visible transmission of Example 4 would drop to about 40% in an IG unit. It can also be seen from Examples 1-4 above that Examples 1-2 may be more desirable in certain respects than Examples 3-4, since the SHGC values for Examples 1-2 are lower than those of Examples 3-4, respectively. In other example embodiments of this invention, it may be possible to modify Examples 3-4 by replacing layer 11 with an absorbing layer of NiCr.

Terms used herein are known in the art. For example, intensity of reflected visible wavelength light, i.e. "reflectance" is defined by its percentage and is reported as $R_xY$ or $R_x$ (i.e. the Y value cited below in ASTM E-308-85), wherein "X" is either "G" for glass side or "F" for film side. Herein, RY means glass side reflective reflectance and FY means film side reflectance. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE WV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The term "shading coefficient" (SC) is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995. SC may be obtained by dividing solar heat gain coefficient (SHGC) by about 0.87. Thus, the following formula may be used: SC=SHGC/0.87.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
    at least first and second infrared (IR) reflecting layers, wherein said IR reflecting layers are spaced apart from one another by at least (i) a dielectric layer comprising tin oxide, (ii) a dielectric layer comprising silicon nitride, and (iii) a dielectric layer comprising zinc oxide, wherein the dielectric layer comprising silicon nitride is located between and contacting the dielectric layer comprising tin oxide and the dielectric layer comprising zinc oxide, wherein the dielectric layer comprising tin oxide is located closer to the glass substrate than is the dielectric layer comprising zinc oxide, and wherein the first IR reflecting layer is located closer to the glass substrate than is the second IR reflecting layer; and
    a metal-based absorption layer comprising $NiCrN_x$ located such that the first and second IR reflecting layers are located over the absorption layer, wherein the absorption layer is sandwiched between and contacting first and second nitride inclusive layers.

2. The coated article of claim 1, wherein the coated article is heat treated.

3. The coated article of claim 1, wherein the absorption layer is from 15 to 100 Å thick.

4. The coated article of claim 1, wherein the absorption layer is from 10 to 200 Å thick.

5. The coated article of claim 1, wherein the absorption layer consists essentially of $NiCrN_x$.

* * * * *